US 8,310,361 B1

(12) United States Patent
Stout et al.

(10) Patent No.: US 8,310,361 B1
(45) Date of Patent: *Nov. 13, 2012

(54) CREATING AND MONITORING ALERTS FOR A GEOGRAPHICAL AREA

(75) Inventors: Bryce Stout, Boulder, CO (US); Brian Brewington, Fort Collins, CO (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/158,785

(22) Filed: Jun. 13, 2011

(51) Int. Cl.
*G08B 1/08* (2006.01)

(52) U.S. Cl. ............. 340/539.11; 340/539.2; 340/995.1; 455/412.2; 455/456.3; 701/409

(58) Field of Classification Search ............ 340/539.11–539.13, 539.2, 573.1, 573.4, 905, 995.1, 995.24, 340/995.12–995.16; 701/208–210; 705/15; 709/221; 455/404.1, 404.2, 412.1, 412.2, 455/456.1, 456.6, 457, 456.3
See application file for complete search history.

(56) References Cited

U.S. PATENT DOCUMENTS

| | | | |
|---|---|---|---|
| 6,577,937 B1 * | 6/2003 | Shuman et al. ................ | 701/48 |
| 7,184,776 B2 | 2/2007 | Fauconnier | |
| 7,379,812 B2 * | 5/2008 | Yoshioka et al. ............. | 701/208 |
| 7,529,850 B2 | 5/2009 | Verma et al. | |
| 7,589,628 B1 * | 9/2009 | Brady, Jr. ................ | 340/539.11 |
| 7,593,740 B2 | 9/2009 | Crowley et al. | |
| 2004/0193617 A1 * | 9/2004 | Adler ........................... | 707/100 |
| 2006/0238382 A1 * | 10/2006 | Kimchi et al. ............ | 340/995.1 |
| 2007/0021908 A1 * | 1/2007 | Jaugilas et al. .............. | 701/208 |
| 2007/0208497 A1 * | 9/2007 | Downs et al. ................ | 701/117 |
| 2009/0322597 A1 | 12/2009 | Medina Herrero et al. | |
| 2011/0270940 A1 * | 11/2011 | Johnson et al. .............. | 709/207 |

* cited by examiner

*Primary Examiner* — Thomas Mullen
(74) *Attorney, Agent, or Firm* — Marshall, Gerstein & Borun LLP

(57) ABSTRACT

A geographical alert system creates an alert for a user-defined geographical area, detects a change to a feature stored in a map-related database, identifies whether the changed feature falls within the user-defined geographical area, and sends a notification to a user when the changed feature of the map-related database falls within the user-defined geographical area. To set up a geographical alert, an alert editor retrieves map data from a map-related database via an alert engine and displays the map data in a visual display to a user. The user then selects a geographical area that the system will automatically monitor for changes. The user may also specify a feature type, and an alert notification type for the alert. The alert engine then processes the user-specified geographical area into geographical area data and stores an alert and its corresponding geographical area data, feature type, and alert notification type in an alert database. When a change in the map-related database is detected, the alert engine obtains the geographic coordinate point data associated with the change and determines whether the geographical coordinate point data associated with the change falls within the geographical area of the stored alert in the alert database and if so, determines if the feature of the changed feature matches the feature of the stored alert. If the feature and geographical coordinate point data of the change corresponds to the feature and geographical area data of the stored alert, then the alert engine transmits an alert to the user using the alert notification type attributes of the stored alert.

38 Claims, 5 Drawing Sheets

CREATING AND MONITORING ALERTS FOR A GEOGRAPHICAL AREA

FIELD OF TECHNOLOGY

This disclosure relates to geographical based alerts and more specifically to a system and a method configured to automatically identify a change in data stored for or associated with a user-specified geographical area and to notify the user of the change.

BACKGROUND

Digital maps are displayed and are used in a wide variety of devices, including car navigation systems, hand-held GPS units, mobile phones, and many websites. Moreover, digital map databases may contain a wealth of information such as satellite images, roads, street photographs taken from the ground level, specific information for a business, three dimensional computer models, etc. Digital maps that incorporate three dimensional computer models may, for example, include buildings, structures, and natural geographic features such as trees, as three dimensional objects. Digital maps may further include terrain topography as a three dimensional raised relief map. However, the information contained within a digital map, as stored in a map database, is frequently updated and changed by digital map developers, three dimensional computer modeling users, digital map users, and computer systems that automatically aggregate information from the Internet. These frequent map updates and changes are especially prevalent with the large number of three dimensional modeling users. With so many modeling users uploading models to the modeling digital map, the likelihood of a user uploading an incorrect or inaccurate model remains high. In response to the possibility of an incorrectly updated model, other modeling users may wish to be notified of any model update. However, when map information is updated for a particular location, such as a three dimensional building update, no propagating means exists to notify an interested user of the map information update.

One conventional technique for determining a change to information stored in a map database for a particular location involves manually examining the information for that particular location via a website or a digital map service. Although this simple inspection is an easy method of determining whether information for one location has been updated, it quickly becomes time consuming and difficult to monitor map information changes occurring for a multitude of locations within a geographical area, such as an entire downtown area.

Another conventional technique for determining when a change is made to information stored in a map database includes subscribing to a text subscription list or email listserv for businesses or commercial entities, such as restaurants, located within a particular geographical area. In this case, the listserv for the particular restaurant or other business entity automatically propagates a notification to the user when any information update about the business or commercial entity occurs, such as a change of menu, a change of opening and closing hours, etc. While the user is able to obtain the new information relatively quickly, this technique is still time consuming and is difficult to use to monitor information changes occurring for a multitude of restaurants or other business entities within a particular geographical area, as a separate subscription must be set up for each business or commercial entity offering the service. Moreover, this technique is limited to obtaining information updates directly from the businesses or commercial entities that offer a subscribing service, which is generally less than all of the businesses or commercial entities within a particular geographical area. Moreover, it is not possible to use this technique to obtain updates being applied to general information stored in map databases, such as changes made to road data, changes in satellite images, etc.

SUMMARY

A computer-implemented method for generating an electronic alert associated with a change of feature data as stored in a map-related database which stores feature data associated with geographical regions includes receiving alert attribute data specifying one or more alert attributes for an electronic alert, the alert attribute data including geographical region data specifying a geographical region to be associated with the electronic alert. The method also includes using the alert attribute data to create an electronic alert and then storing the electronic alert in an alert database, the stored electronic alert adapted to be used to notify a recipient of a change in feature data stored in the map-related database for the specified geographical region of the electronic alert. The method additionally detects a change to feature data within the map-related database, determines whether the feature associated with the changed feature data is a feature associated with the specified geographical region of the stored electronic alert and sends an electronic notification to the recipient if the feature associated with the changed feature data is associated with the specified geographical region of the stored electronic alert.

In some cases the method may also receive alert attribute data including feature type data, the feature type data indicating a type of feature for the electronic alert. In this case, the method may determine whether the feature associated with the changed feature data matches the feature type of the electronic alert and may send an alert notification if or only when the changed feature data is for a feature that matches the feature type data of the electronic alert. If desired, the feature type data may specify one or more of a map feature, map data entity, informational data for a business entity, a three dimensional model, a satellite image, a photographic image, or a mobile device location.

The computer-implemented method for generating an electronic alert may also receive alert attribute data in the form of alert notification type data for the electronic alert, wherein the alert notification type data indicates how to notify the recipient of the changed feature data within the map-related database. Here, the method may send an electronic notification to the recipient based on the alert notification type data, such as via an email or a text message or a phone call or an account notification. If desired, the alert notification type data may identify or specify the recipient by one or more of a phone number, an email address, or an account notification and may specify a timing to be used to send the alert notification to the recipient, such as immediately upon detection of the changed feature data, periodically such as once a day, once a week, etc.

The computer-implemented method may receive alert attribute data specifying a geographical region for an electronic alert by enabling a user to indicate the specified geographical region for the electronic alert via a user interface. In this case, the method may present a map of a first geographical region to the user via the user interface and may enable the user to select the specified geographical region for the electronic alert as a portion of the first geographical region presented on the map, such as by enabling the user to demarcate one or more boundaries of the specified geographical region by indicating the one or more boundaries of the specified geographical region on the presented map.

In another embodiment, a geographical alert system for generating an electronic alert associated with a change of feature data stored in a map-related database that stores features associated with geographical regions includes an alert generation routine stored on one or more computer memories and that executes on the one or more computer processors to receive alert attribute data from one or more users specifying one or more alert attributes for an electronic alert, the alert attribute data including geographical region data specifying a geographical region to be associated with the electronic alert, the feature type, the alert notification type, etc. The geographical alert system may also include an alert creation routine stored on one or more computer memories and that executes on one or more computer processors to create one or more electronic alerts based on the received alert attribute data. The alert creation routine may then store the one or more electronic alerts in an alert database, each stored electronic alert adapted to be used to notify a recipient of a change in feature data as stored in the map-related database for a specified geographical region associated with the electronic alert. Still further, the geographical alert system may include an alert detection routine stored on one or more computer memories and that executes on one or more computer processors to detect a change to feature data within the map-related database, to analyze whether the feature associated with the changed feature data is for a feature within the specified geographical region of one or more of the stored electronic alerts stored in the alert database and to send an electronic notification to a recipient for one or more of the stored electronic alerts if the feature data associated with the changed feature data is associated with the specified geographical region of the one or more of the stored electronic alerts.

In another embodiment, a computer-implemented method for creating an electronic alert associated with changes of feature data in a map-related database that stores feature data for features associated with geographical locations includes receiving alert attribute data specifying one or more alert attributes for an electronic alert, the alert attribute data including geographical region data specifying a geographical region to be associated with an electronic alert and alert notification type data indicating a manner of notifying a recipient of changed feature data within the map-related database. The method also includes using the alert attribute data to create an electronic alert and storing the electronic alert in an alert database, the stored electronic alert adapted to be used to notify the recipient of changed feature data as stored in the map-related database for the specified geographical region of the electronic alert according to the alert notification type data of the electronic alert.

In a still further embodiment, a computer-implemented method for executing an electronic alert in response to a change of feature data in a map-related database that stores feature data for features associated with geographical regions includes detecting a change to feature data within the map-related database, and retrieving one or more stored electronic alerts from an alert database storing a set of electronic alerts, each of the retrieved electronic alerts including alert attribute data including a geographical region associated with the electronic alert and a recipient. The computer-implemented method also determines whether a feature associated with the changed feature data is located within a geographical region specified by one of the retrieved electronic alerts and sends an electronic notification to a recipient of the one of the retrieved electronic alerts if the feature data associated with the changed feature data is associated with the specified geographical region of the one of the retrieved electronic alerts.

In another embodiment, a geographical alert system for generating an electronic alert associated with a change of feature data stored in a map-related database that stores features associated with geographical regions includes an alert detection routine stored in one or more computer memories and that executes on one or more computer processors to detect a change to feature data within the map-related database and an alert retrieval routine stored in one or more computer memories that executes on one or more computer processors to retrieve one or more electronic alerts stored in an alert database, each retrieved alert including alert attribute data including a geographical region associated with the electronic alert and a recipient. The geographical alert system also includes an alert analysis routine stored in one or more computer memories that executes on one or more computer processors to analyze whether the feature associated with the changed feature data is a feature within the specified geographical region of one or more of the stored electronic alerts and an electronic notification routine stored in one or more computer memories and that executes on one or more computer processors to send an alert notification to the recipient of the one or more stored electronic alerts if the feature associated with the changed feature data is a feature within the specified geographical region of the one or more stored electronic alerts.

DETAILED DESCRIPTION

Figure 1:
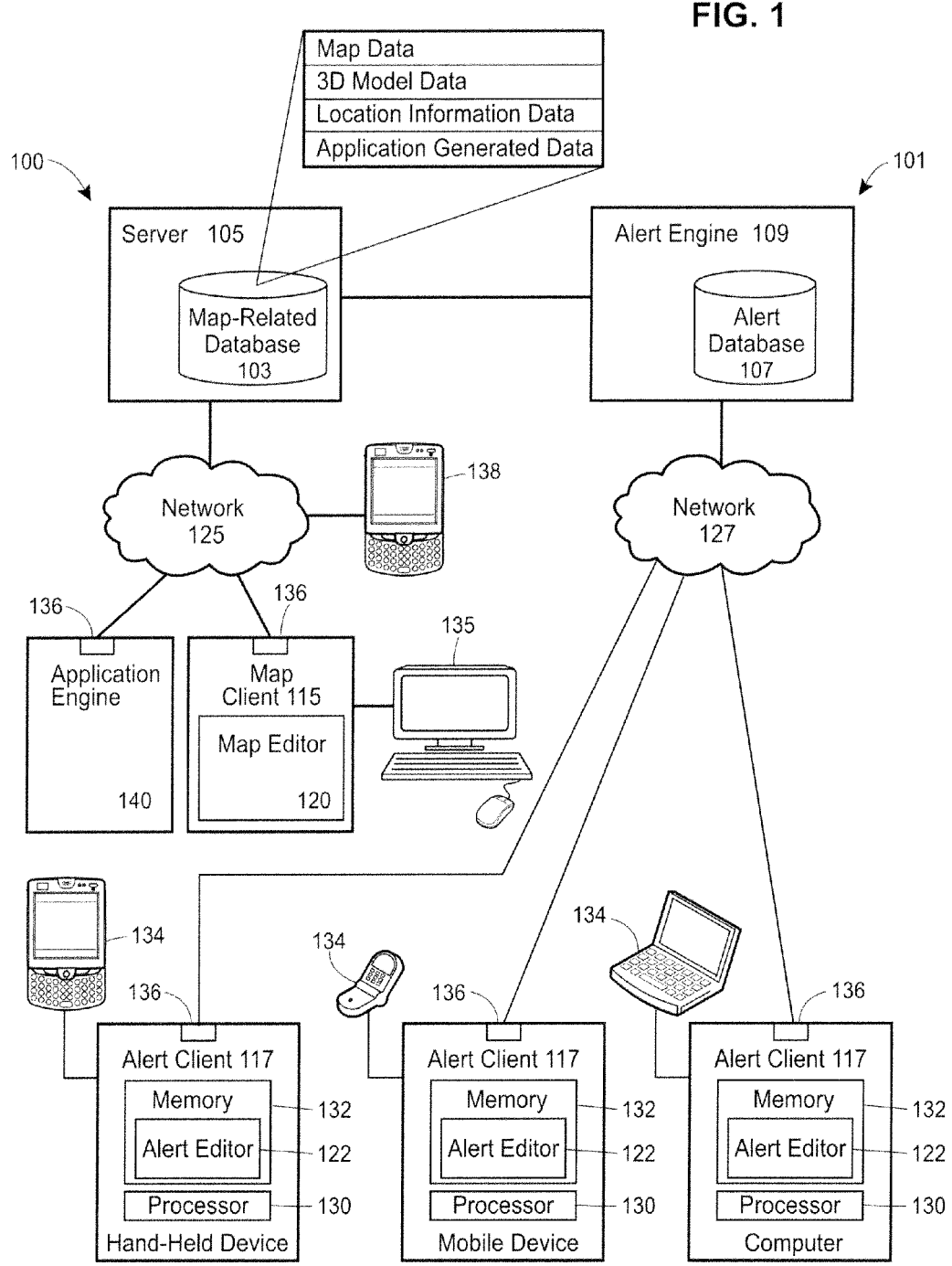
FIG. 1 is a high-level block diagram of a computing environment that implements an alert system that creates and monitors alerts for a geographical area.

Generally speaking, an alert system creates an alert for a user-specified geographical area, as defined on a digital map, and sends a notification to the user when one or more changes occur to features or feature data stored within a map-related database that are within the user specified geographical area. To set up or establish a geographical alert, an alert engine retrieves map data from a map-related database and displays the map data in a visual display to a user. The user then specifies, via the digital display, a geographical area that the alert system is to monitor so as to detect changes in data stored in a map-related database associated with the geographical area. The user may additionally specify one or more feature types or layers of data, as stored in the digital map database, to which the alert is to be limited, such as detecting changes only in roads within the specified geographical area, detecting changes in particular layers of map data, or detecting changes to other types of map-database related features, such as three dimensional models, Place Page data, etc. The user may also specify an alert notification type that indicates a communication method and a timing to be used by the alert system to send alert notifications to the user. The alert system then stores the geographical area, the feature type, and the alert notification type as an alert in an alert database. Thereafter, when a change is detected in data (i.e., to a feature) stored in the map-related database, the alert system retrieves feature data associated with the changed feature from the map-related database. If the feature data associated with the change is determined to fall within the geographical area established for the stored alert and is of the same type as the feature type of the stored alert, then the alert system sends a notification to the user according to the attributes of the alert notification type of the stored alert. A change may include for example, map data changes, an updated business listing, a model update to a geographically accurate, three dimensional computer model of a building, etc.

By way of illustration, a geographical alert may be established to notify a user when changes are made to any three dimensional model of a building stored in a map-related database. In this case, an alert engine retrieves map data from a map database and displays a digital map of a region to a user. The user may then specify a particular city or part of a city as a geographical area to be associated with the alert, and may specify all three dimensional models (e.g., building models) as a feature type to monitor for changes. The user may also specify an alert type as one that sends an email notification to the user immediately upon detection of a change to any of the three dimensional model buildings within the user specified geographical area. Thereafter, when a change occurs to a three dimensional building model within the specified geographical area, such as a recent three dimensional model update of city hall, the alert system immediately sends an email notification informing the user of the three dimensional model building change, along with information regarding the nature or specifics of the change, if desired. Such an alert allows the user to review the changed data within the map database to determine if the change is accurate or acceptable, to download the new data for other uses, such as in other applications, etc.

FIG. 1 is a high-level block diagram that illustrates a computing environment for a map database editing system 100 and an alert engine system 101 that may be used to establish a geographical alert for a geographical area and to send an alert notification when a change occurs to data within a map-related database 103 that stores information, such as map information, about the geographical area. The alert engine system 101 includes an alert database 107 and an alert engine 109 that is connected to a number of alert clients 117 through a communication network 127. The alert database 107 may be connected to or may be disposed within the alert engine 109 which may be, for example, implemented in a server having a processor (not shown) and a computer readable medium or storage unit (not shown) of any desired type or configuration. Each alert client 117 includes a processor 130, a computer readable memory 132, and a network interface 136. The computer readable memory 132 may store an alert editor 122 that communicates with the alert database 107 via an associated network interface 136. Alternatively, the alert editor 122 may be stored in the alert engine 109 and be accessible via a web interface. Any particular alert client 117 may be connected to or may be disposed within a user interface device 134 that may be for example, a hand-held device, such as a smart phone or tablet computer, a mobile device, such as a mobile phone, a car navigation system or computer system, a computer, such as a laptop or a desktop computer, or any other device that allows a user to interface using the network 127. Any particular alert client 117 may also be connected to or may be disposed within a map editor 120 (discussed below). While only three alert clients 117 are illustrated in FIG. 1 to simplify and clarify the description, it is understood that any number of alert clients 117 are supported and can be in communication with the alert engine 109.

The map database editing system 100 includes a server 105 that is connected to a map-related client 115 through a communication network 125. The map-related database 103 is connected to or is disposed within the server 105 and stores map-related data of any type, including for example, data pertaining to roads, geographical features, buildings, building models, terrain, satellite images, information regarding businesses, commercial entities, etc. (e.g., Place Page data), labels, names, addresses, etc. Generally speaking, the data stored in the map-related database 103 may be any data defining a map or geographical area, or defining or related to features or elements shown on a map or within a geographical area.

The map-related client 115 stores a map editor 120 and may include a user interface 135. The map editor 120 communicates with the map-related database 103 via a network interface 136 and operates to enable a user to create or to edit map or other data (referred to herein as map-related data) in the map-related database 103. As illustrated in FIG. 1, the server 105 may also be connected to and may communicate with one or more application engines 140 through the communication network 125 via a network interface 136. The application engine 140, which may be stored in a separate server, for example, is connected to a client device 138 through the communication network 125 for example, and may operate to create and store application data and to communicate this application data to the map-related database 103. Application data may be any data generated or stored by an application of any type that pertains to, that is associated with or that is related to the geographical data stored in the map-related database 103. The application engine 140 can be stored in external storage attached to the server 105, stored within the server 105 or can be stored within the client device 138 or in the alert engine 109. Additionally, there may be multiple application engines 140 that connect to the map-related database 103.

The communication networks 125 and 127 may include, but are not limited to, any combination of a LAN, a MAN, a WAN, a mobile, a wired or wireless network, a private network, or a virtual private network. Moreover, while the communication networks 125 and 127 are illustrated separately in FIG. 1 to simplify and clarify the description, it is understood that only one network or more than two networks may be used to support communications with respect to the map-related clients 115, the client devices 138, and the alert clients 117. Moreover, while only one application client 138 is illustrated in FIG. 1, it is understood that any number of application clients 138 are supported and can be in communication with the application engine 140.

As indicated above, the map database 103, which may be stored in or may be separate from the server 105, may contain any type of map data, three dimensional (3D) model data, location information data (e.g., information about or stored for businesses or commercial entities, such as menus, hours of operations, website URLs, etc.), and application generated data as well as any other desired types of data. Generally, map data can be used to generate a digital map that may include roads, buildings, parks, or any other features appearing on a map. Physical roads may be represented in the map data by a list of nodes that represent geographical coordinate points (e.g. latitude and longitude) and road segments that connect those nodes. Other features, such as buildings and parks, similarly correspond to a specific geographical location in the physical world, and the data representation of each feature also includes a set of geographical coordinate points. Map data may be in the form of satellite image data, pictures, traditional road map data, etc. Map data may be generally updated by map developers or other computer systems. However, in many cases, map data, as well as location information data, building model data, application data, etc. may be updated by individuals or particular users in any desired manner.

The map data stored in the map-related database 103 can be obtained from several different sources, such as the New York City Open Accessible Space Information System (OASIS) and the U.S. Census Bureau Topologically Integrated Geographic Encoding and Referencing system (TIGER). The map data can also be accessed by the map editor 120, can be modified, and can be stored back into the map database 103. Further, the map database 103 does not need to be physically located within server 105. For example, the map database 103 can be placed within a map-related client 115, can be stored in external storage attached to the server 105, or can be stored in a network attached storage. Additionally, there may be multiple servers 105 that connect to a single map-related database 103 or the map-related database 103 may be stored in multiple different or separate physical data storage devices. The map-related client 115 executes the map editor 120, which operates to allow a user to modify the map data stored in the map database 103, for example, to create a digital map, to update data within the map database 103 or to associate more information with the map data to make applications that access the map data within the map database 103 run faster, more efficiently, or better in some other manner.

The map database 103 may also contain 3D computer model data that represents the digital map as a 3D computer generated model. Similar to the map data, the 3D computer model data may also include roads, buildings, parks, etc. that each correspond to a specific geographical location in the physical world. However, the 3D computer model may additionally include the height, shape, and 3D structure of buildings, bridges, towers, trees, and other 3D computer model objects. These 3D computer model objects may also depict textures, such as roof shingles or pavement, and details, such as windows, fixtures, columns, etc. The 3D computer model may also include two dimensional images or photographs affixed to a face of a 3D computer model object, such as a building, and may include terrain topography represented as a raised relief map that three dimensionally displays landscape features such as hills, canyons, mountains, rivers, and slopes. The 3D computer model data can be generated by users uploading 3D computer models of buildings, structures, etc. to the map-related database 103 from the map editor 120 or any other application, such as a 3D modeling application.

The map database 103 may likewise store location information data that represents supplemental information associated with a feature at a particular geographical location or point. For instance, location information data may exist for a business, a point of interest, a transit station, a landmark, etc. Location information data may include addresses, telephone numbers, email addresses, user reviews, menus, transit schedules, business hours, photographs of the location or businesses at the location, etc. Location information data for a road segment can include a street name, a priority (e.g. a highway or a local road), address ranges, etc. Location information data may be user generated or may be updated by another computer system.

Still further, the map-related database 103 may accept and store application-generated data that may be provided by or used in conjunction with the application engine 140. The application-generated data can, for example, be accessed by the application engine 140, modified, and stored back into the map database 103, or can be generated by the application engine 140 and provided to the map database 103. The application generated data may be data generated by or used by any type of application, such as a user or mobile device location tracking application, a phone number and address accessing application, etc. As one example, an application implemented by the application engine 140 may aggregate listings for businesses, such as an online telephone book. When a telephone number of a restaurant is updated within the application, for example, the application notifies the application engine 140 of the address update. The application engine 140 then updates the application generated data in the map-related database 103 indicating a change associated with the restaurant, namely the updated telephone number of the restaurant. Of course, other types of applications may provide or update the application generated data within the map-related database 103 with other information associated with the restaurant, such as the address of the restaurant, the website of the restaurant, reviews of the restaurant, the menu of the restaurant, etc. As other examples, application generated data may include satellite imagery from a satellite imaging application, road construction or traffic information from a department of transportation application, snow ski reports or weather reports from a weather application, a time change for a social event from a social networking application, etc. As another example, application generated information can represent the current location of a client device 138 or a person as determined by a location tracking application. For example, an application may track the location of a client device 138 (and the user that possesses it) and this location data may continually or periodically be updated and stored within the map database 103. This data may be used by one or more other applications to enable mobile users to track where their friends and family are currently located, etc. Specifically, the client device 138 may include a location awareness module that continually or periodically transmits updated information associated with a current geographical location of the client device 138. This location awareness module may use a global navigation satellite system, such as the Global Positioning System (GPS), cellular phone triangulation, wireless IP address network location finder, or any other suitable method for locating the position of a device. The application 140 may, in turn, process this updated information from the client device 138 and update the location information data in the map database 103, if necessary, with the present location of the client device 138.

As an illustration of how user location application data can be used in a geographical alert, a user may create a geographical alert using the GPS location data from a location tracking application 140 to notify the user when a friend of the user enters a user-specified geographical area, such as the limits of a particular city. In this example, a location awareness module within the friend's client device 138 sends the current location of the friend's client device 138 to the application 140. The application 140 may use determination factors, for example, privacy settings set by the friend of the user, whether the friend of the user has traveled a sufficient distance to warrant updating the map database 103, etc. to determine whether and when to send the new location of the friend to the map-related database 103 as a change. If the determination is made to update the map-related database 103 with the new location data of the friend, the application 140 updates or changes the location information in map-related database 103 to reflect the current location of the friend. The alert engine 109 may then detect this change in the map database 103, and may determine whether the new location of the client device 138 of the friend falls within the user-specified geographical area. If the client device 138 is determined to fall within the user specified geographical area, the alert engine 109 sends a notification to the user (via the network 127) that the user's friend has entered into the specified geographical area.

During operation, the alert engine system 101 communicates with the map database editing system 100 through the communicative coupling of the alert engine 109 and the server 105. First of all, this communicative coupling allows the alert engine 109 to retrieve map data from the map-related database 103 for displaying a digital map to the user. This communicative coupling also permits the server 105 to send a change message that makes the alert engine 109 aware of a change made to data stored within the map-related database 103. In response to the change message, the alert engine 109 may retrieve the data associated with the change from the map-related database 103. In another embodiment, the alert engine 109 may poll the server 105 to determine whether a change has occurred in the map-related database 103 for any or each geographical area for which an alert has been created. If a change is discovered, the alert engine 109 retrieves the map data associated with the change. Alternatively, the server 105 may propagate the map data associated with the change to the alert engine 109 in response to polling by the alert engine 109.

In a general scenario, a user may wish to create an alert for a particular geographical area to notify the user of any changes in the map data for that geographical area. To do so, the user interfaces with the alert editor 122 via one of the user interfaces 134. The alert editor 122 sends a request to the alert engine 109 to display a digital map as part of the process of creating a geographical alert. In response to the request from the alert editor 122, the alert engine 109 retrieves map data from the map database 103 and conveys the map data to the alert editor 122 for display to the user in selecting a geographical area to be associated with the alert. The user then specifies a geographical area for the alert on the displayed map, and the alert editor 122 communicates the selected geographical area to the alert engine 109 as the geographical area for (associated with) the alert. The alert editor 122 may also prompt the user for other information pertaining to or defining the alert, such as feature type information defining map features to be associated with the alert, and alert notification type information defining the manner and timing associated with the notifications to be sent to the user. This data is then sent, along with a definition of the selected geographical area to which the alert is to apply, to the alert engine 109 which uses this data to create and store an alert within the alert database 107.

Thereafter, another user may execute a map editor 120 and update or change the map-related data within the map-related database 103. At this time, the server 105 transmits a message to make the alert engine 109 aware of the data change. In response, the alert engine 109 retrieves the map-related data associated with the change from the map database 103 and determines whether the retrieved data falls within the geographical area data of the stored alert. If so, the alert engine 109 may see if the data that was changed matches the feature type of the alert. If so, the alert engine 109 sends a notification to the user using the alert notification type information.

Of course, the alert data stored in the alert database 107 can be created or accessed by one of the alert editors 122, can be modified, and can be stored back into the alert database 107 at various different times to create and modify alerts. As will be understood, the alert database 107 does not need to be physically located within alert engine 109. For example, the alert database 107 can be placed within an alert client 117, can be stored in external storage attached to the alert engine 109, can be stored within server 105, or can be stored in a network attached storage. Additionally, there may be multiple alert engines 109 that connect to a single alert database 107. Likewise, the alert database 107 may be stored in multiple different or separate physical data storage devices. Furthermore, the alert engine 109 does not need to be directly connected to the server 105. For example, the alert engine 109 can be placed within an alert client 117 or can be stored within the server 105.

Figure 2:
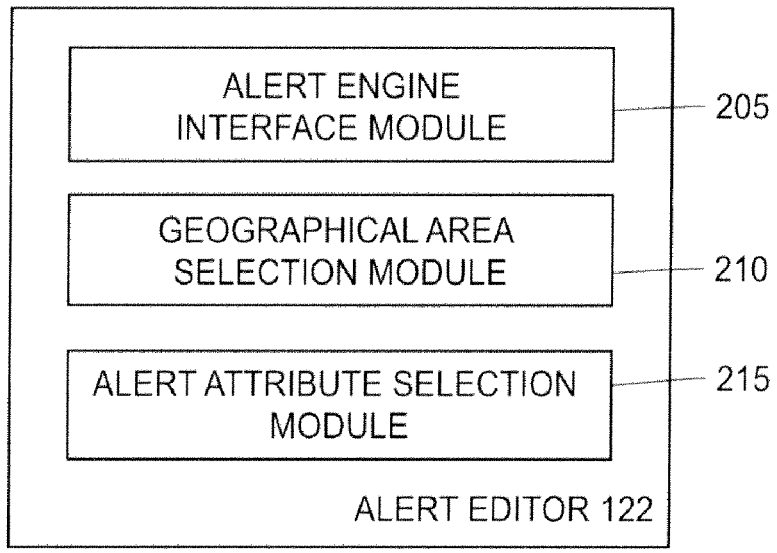
FIG. 2 is a high-level block diagram illustrating modules within an alert editor.

FIG. 2 illustrates an example high-level block diagram illustrating various modules within or associated with one of the alert editors 122 that may be implemented to perform user interfacing with the alert engine 109 and the alert database 107 and to create a geographical alert as described herein. As illustrated, the alert editor 122 includes an alert engine interface module 205, a geographical area selection module 210, and an alert attribute selection module 215. Generally speaking, the alert engine interface module 205 operates to retrieve alert data from the alert database 107 and map data from the map-related database 103 via the alert engine 109. The alert engine interface module 205 also serves to send alert data, such as geographical area data, feature type data, and alert notification type data, to the alert database 107 for storage as part of a created alert. The geographical area selection module 210 is a user interface module that enables a user to select a geographical area that the system monitors for changes as part of an alert. Likewise, the alert attribute selection module 215 is a user interface module that enables a user to select alert attribute data, such as one or more feature types and alert notification types for a given alert.

Figure 3:
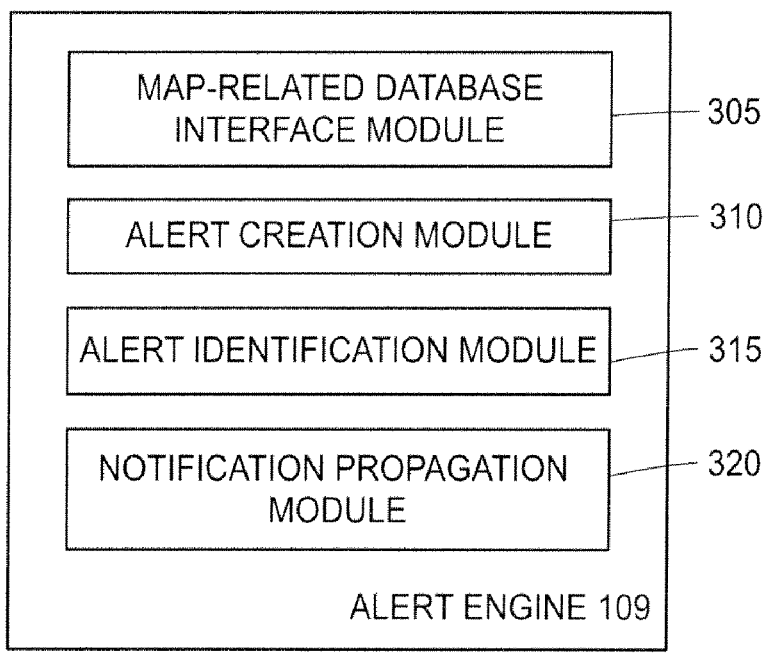
FIG. 3 is a high-level block diagram illustrating modules within an alert engine.

FIG. 3 illustrates an example high level block diagram illustrating various modules within or associated with the alert engine 109 that may be implemented to perform alert administration. As illustrated, the alert engine 109 includes a map-related database interface module 305, an alert creation module 310, an alert identification module 315, and a notification propagation module 320. Generally speaking, the map-related database interface module 305 retrieves map data from the map-related database 103 in the process of relaying the map data to the alert editor 122. The map-related database interface module 305 also operates to detect the occurrences of changes to data stored in the map-related database 103. The alert creation module 310 processes the geographical area specified by the user and then stores the corresponding processed geographical area data and alert attribute data in the alert database 107 as a stored alert. The alert identification module 315, on the other hand, determines whether a change in the map-related database 103 falls within the geographical area data and the feature type data associated with a stored alert. The notification propagation module 320 operates to send a notification informing the user that a change occurred within a specified geographical area with the specified feature type as determined by the alert identification module 315.

Of course, some embodiments of the alert editor 122 and the alert engine 109 may have different and/or other modules than the ones described herein. Similarly, the functions described herein can be distributed among the modules in accordance with other embodiments in a different manner than that described herein. However, one possible operation of these modules is explained below with reference to FIGS. 4-6.

Figure 4:
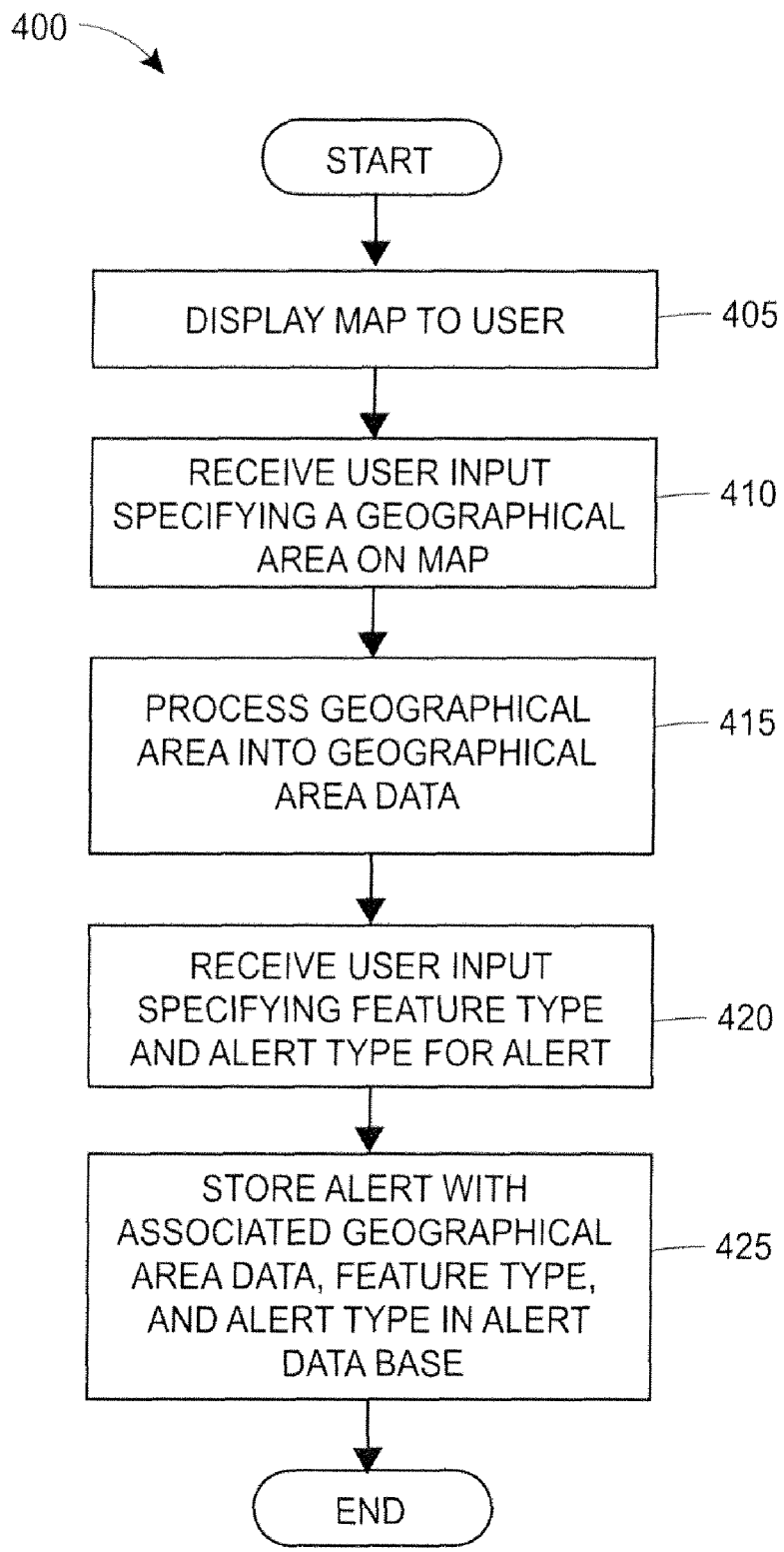
FIG. 4 illustrates an example routine or a process flow diagram for creating and storing an alert for a geographical area.

FIG. 4 illustrates a routine or a process flow diagram 400 associated creating a geographical alert and more particularly with accessing map data from the map-related database 103 and displaying the map data to the user (implemented by modules 205 and 305), selecting a geographical area on the displayed map and specifying alert attributes (implemented by modules 210 and 215), creating an alert by processing the geographical area into geographical area data and feature type data (implemented by module 310), and storing the alert in the alert database 107 (implemented by module 310).

More particularly, at a step or a block 405, the alert engine interface module 205 within alert editor 122 operates to present a displayed map to the user via the user interface 134. Of course, the alert engine interface module 205 will use the map-related database interface module 305 within the alert engine 109 to access the map database 103 within the server 105 to obtain the map data needed for such a display. The displayed map may be rendered from vector map data, raster map data, 3D computer model map data, or any other suitable type of map data representation scheme.

At a block 410, the geographical area selection module 210 then enables a user to highlight or select an area of the displayed map to thereby define the geographical area to be associated with a particular alert. For example, the block 410 may enable a user to draw a box or other indicator around a particular geographic area or portion of the map. More particularly, the block 410 may enable a user to specify or select predetermined geographical or political areas, such as counties, states, municipalities, area codes, ZIP codes, etc., from a list or to directly highlight an area on the displayed map. Of course, the block 410 may enable the user to specify any geographic area by any other suitable means. For example, the available geographic areas may be those as defined and stored in the map-related database 103 itself, or may be specified manually or interactively by the user via the user interface 134. Other exemplary manners of identifying geographic areas may include specifying a circle via a geographical point and a radius length, bounding an area by streets or roads, or indicating indoor public areas such as malls, hospitals, etc. The geographic area may also be specified as one or more thoroughfares such as roads, transit rail lines, or bike paths and may include user-defined fixed widths flanking such thoroughfares. A geographical area as specified by the user is not limited to a two-dimensional plane, but may include three-dimensional space definitions, such as the first two stories of a downtown area of a major city, to enable the user to define commercial retail space as an area of interest.

Figure 5:
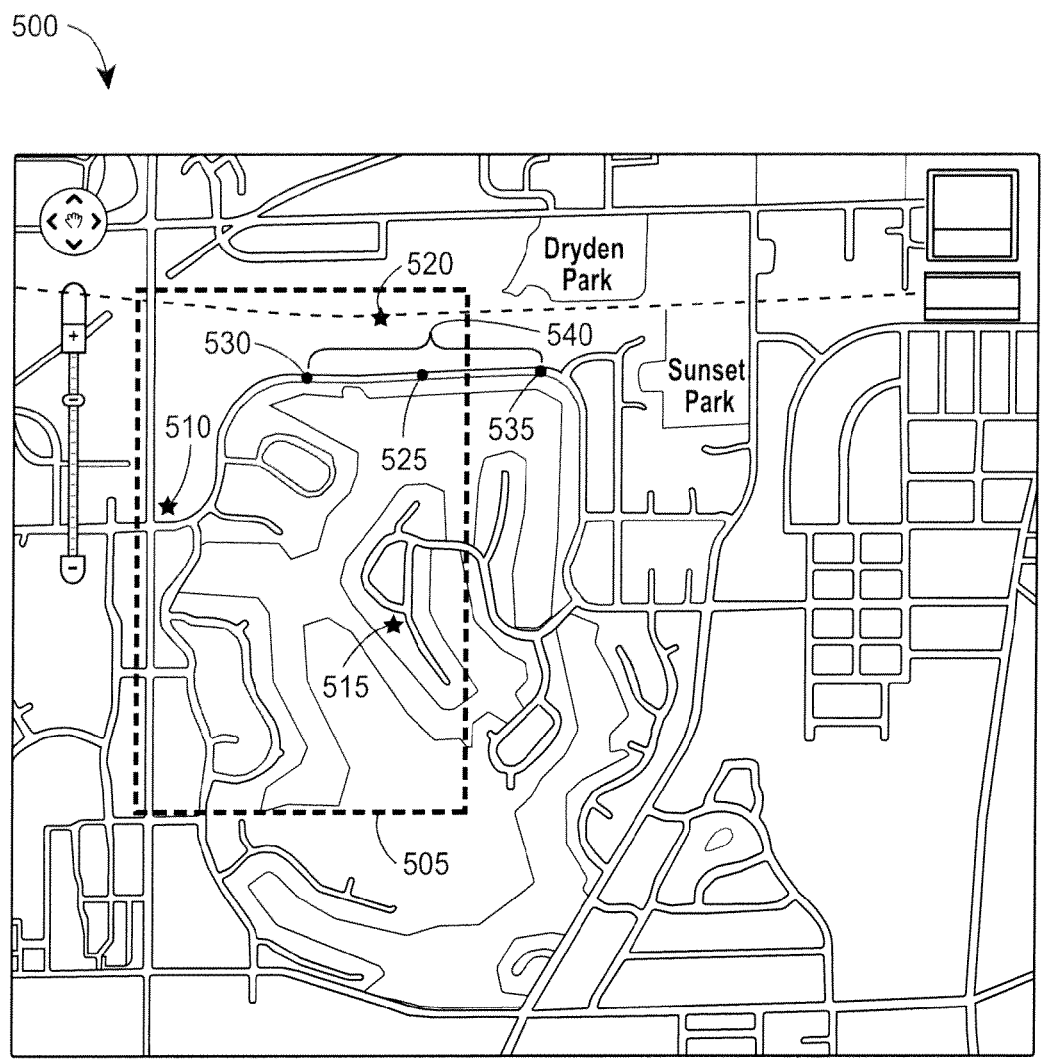
FIG. 5 illustrates an example visual display that may be produced by an alert engine and an alert editor that marks a region to enable a user to denote a geographical area.

In one example illustrated in FIG. 5, the block 410 may display, on the user interface 134, map data associated with a particular geographical region 500, as obtained from the map-related database 103. The geographical area selection module 210 may obtain the particular map data used to display the map shown in FIG. 5 in any desired manner, such as by enabling the user to specify a general geographical area by name, address or other designation, by enabling the user to zoom in on a particular geographical location from a larger map, etc. The geographical area selection module 210 then enables a user to highlight or select a subset of the displayed geographic region using the mouse and/or a cursor to draw a boundary around the geographical area to be monitored for changes. This activity is illustrated in FIG. 5 as a rectangular dotted line box drawn by a user to specify a selected geographical area 505 and thus a geographical area to be monitored by or associated with a geographical alert. Of course the geographical area selection module 210 may enable the user to select or specify a geographical area to monitor in any other desired manner, including by using other drawing tools and other manners of specifying a geographical area (e.g., using pre-established areas such as those stored in the map-related database 103, all areas associated with particular roads, a circle of a specified radius, a rectangular box of specified size drawn from a specified center point, etc.)

Once the user indicates or otherwise selects a geographic area for an alert, a block 415 of FIG. 4 implements the alert attribute creation module 215 which processes the geographical area into geographical area data that keys the geographical area to an area in the physical world. In one embodiment, the block 415 may use vector map data to represent the geographical area in terms of points, lines, or polygons. After obtaining the geographical area, the block 415 then converts the geographical area into geographical area data that may include a set of geographical coordinate points, lines between geographical coordinate points, polygons represented in terms of geographical coordinate points, etc. Of course, the selected or specified geographical area may be defined or identified and then stored in any other desirable or suitable manner.

Referring back to FIG. 4, a block 420 next enables a user to specify one or more particular feature types for the alert being created to thereby limit the scope of the alert monitoring to particular features (e.g., types of data changes). As previously mentioned, a feature type may specify one or more features or types of data to monitor for an alert, such as satellite images, photograph images, buildings, businesses, residences, parks, transit stations, bike paths or roads, terrain, 3D models, or any other types of objects or data tied to a particular geographical location. Features may also include location information data such as updated restaurant or business listings, or application generated data such as changes in transient or ephemeral objects such as weather, social events, the current location of people, etc. Generally speaking, by default, all feature types (i.e., types of data) located within the geographical area will automatically be monitored for changes when an alert is established. However, a user may specify that the alert system is to only monitor one or more particular feature types for changes, so that changes to other features within the geographical area specified for the alert do not trigger an alert notification. When specifying feature types, the block 420 may also enable the user to click on a particular feature on the displayed map as a representative type of an entire category of the particular feature. For example, in recognizing that the user clicked on a restaurant on the displayed map, the block 420 may mark the feature type as all restaurants located within the geographical area. The selection process is of course not limited to selecting a feature on a displayed map, but may include the use of a displayed list of feature categories or by any other suitable means.

After the geographical areas and features for an alert have been specified, the block 420 enables a user to select an alert notification type for the alert being created. Generally speaking, the alert notification type specifies who to notify when the alert conditions are met, how to notify these persons, and when to notify these persons. As noted above, an alert notification type may specify any suitable means of user notification, such as email, text, voicemail, account notification, etc., which is to be used to inform a user of a change of data of the specified feature type or types within the specified geographical area. Next, the block 420 may enable the user to select other defining properties of the alert notification type that are to be associated with the notification. For instance, the block 420 may allow the user to select other users, such as friends or family, with which to share the notification. The block 420 may also allow the user to determine a frequency at which to be notified of changes. For example, the notification may be sent immediately to notify the user upon the alert engine 109 detecting a change or may be held by the notification propagation module 320 (discussed below) and may be sent at a user-defined periodic interval, such as daily or weekly. In addition, other properties of the alert type may include a future date or a future time to begin monitoring the geographical area, an ending date or time, at which the alert is to be discontinued, etc.

If desired, a user may elect to use another user's specified geographical area that was previously created and stored in an alert by subscribing to the other user's alert in lieu of creating an alert. In this instance, the alert editor 122 may retrieve the stored alert associated with the other user, and may modify the data of the stored alert to add the user's notification information. While subscribing to the stored alert, the user will receive a notification when a change occurs within the geographical area data associated with the stored alert in addition to the other user. Furthermore, a user may create and store an alert to which other users may subscribe to receive an alert notification. When the alert engine 109 detects and retrieves a change from the map-related database 103, the alert engine 109 will send an alert notification to any user subscribed to the stored alert at the time the change is detected. In this case, the user may retain the right to modify the alert attributes of the stored alert or may give other users the right to modify the alert attributes. In addition, the alert engine system 101 may send a notification to all users subscribed to the stored alert when one of the users possessing administrative rights modifies one of the alert attributes of the stored alert. In any event, at a block 425, the alert creation module 310 stores the geographical area data, the feature type, and alert type as an alert in the alert database 107.

Figure 6:
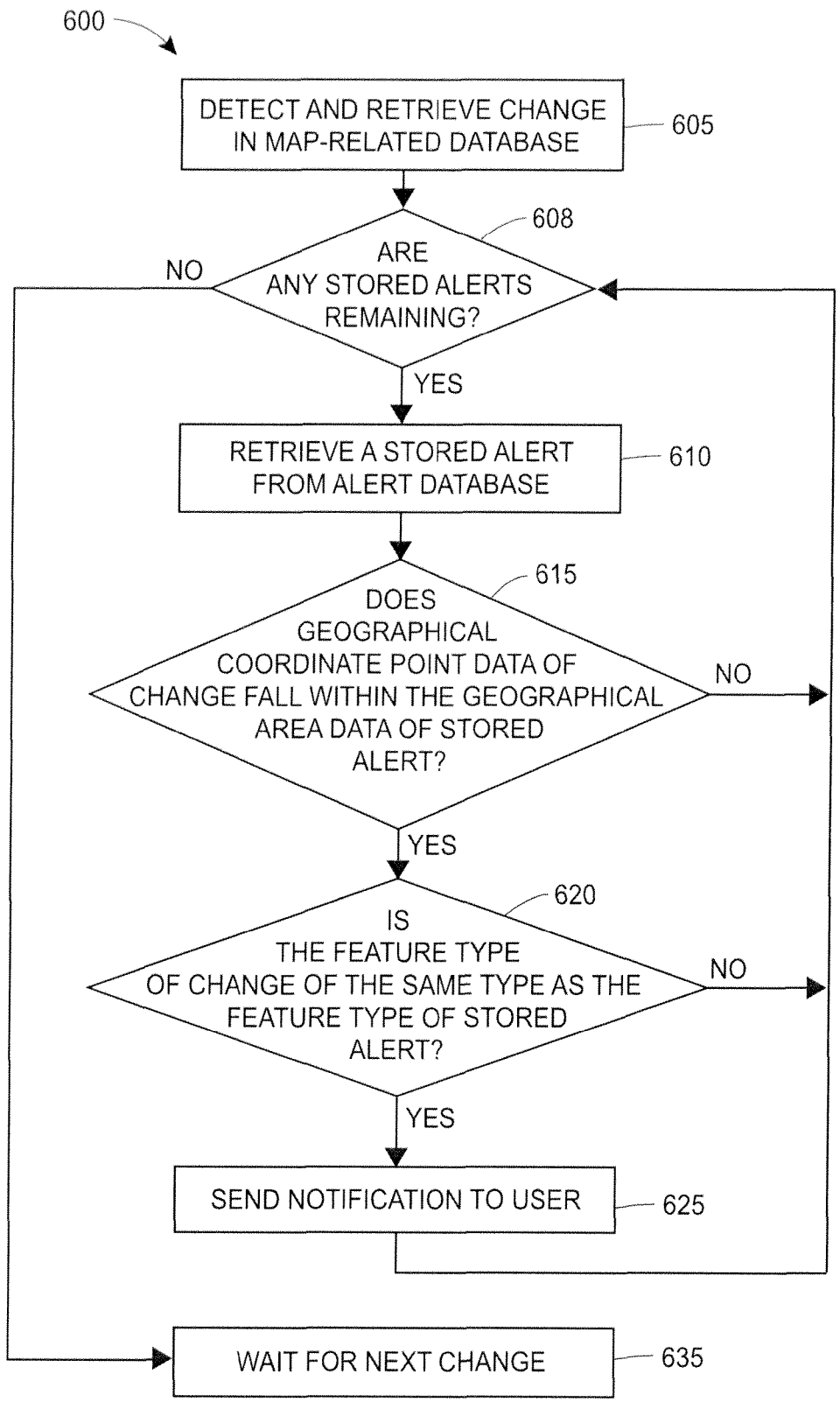
FIG. 6 illustrates an example routine or a process flow diagram for identifying a stored alert associated with a change in a map database and for sending a notification to a user.

FIG. 6 illustrates a routine or a process flow diagram 600 that may be implemented by the alert identification module 315 and the notification propagation module 320 of FIG. 3 to detect and send alert notifications based on alerts stored in the alert database 107. Generally, the module 315 detects and retrieve changes from the map-related database 103, and then analyzes stored alerts within the alert database 107 to determine whether a detected change is of the feature type and is within the geographical area specified by one or more of the stored alerts. If so, the module 320 sends a notification of the change to the user. In particular, at a block 605, the alert identification module 315 detects and retrieves a change in data from the map-related database 103. Alternatively, the map system 100 may make the block 605 aware of a change in the map-related database 103. Generally speaking, a change occurs when any modification is made to any data contained in a map database 103, including any of the map data, the 3D model data, the location information data and the application data. A data change may be one that adds data, deletes data, or changes existing data within the map-related database 103.

At the block 605, the alert identification module 315 of FIG. 3 retrieves the map data associated with the change from the map-related database 103 and identifies or determines the geographical coordinate point and the feature type(s) of the change. The block 605 may detect a change to the map-related database 103 by continually polling a change queue maintained by the server 105 to determine whether a change has occurred. This change queue may be stored on the server 105 or in the map-related database 103 and may log a record for each change that occurs in the map-related database 103. If desired, the change queue may store a pointer to point to the geographical coordinate point data for each change in the map-related database 103. The routine 605, in using the pointer information in the change queue, may retrieve the geographical coordinate point data and all associated data, such as the feature type of the change, from the map-related database 103.

In one example, if a friend of a user enters within the user-specified geographical area, such as the city limits, the block 605 detects that a change occurs in the map-related database 103 (specifically in the application data) by polling the change queue and recognizing a new pointer entry. Using this pointer, the block 605 may locate and retrieve the geographical coordinate point data for the change and its associated feature type(s) from the map-related database 103. Alternatively, the map system 100 may store the geographical coordinate point data and all associated data, such as feature type data, in the change queue so that the routine 600 may retrieve all the data associated with the change directly from the change queue. In any event, after the block 605 detects and retrieves the data associated with the change from the map-related database 103, a block 608 operates to determine whether any stored alerts reside in the alert database 107. If so, the block 608 transfers control to a block 610 to retrieve a stored alert. If not, the block 608 transfers control to a block 635 that waits for the next change to occur.

A block 610 operates to retrieve a stored alert from the alert database 107. The stored alert includes the processed geographical area data, the feature type, and the alert notification type. At a block 615, the alert identification module 315 determines whether the retrieved geographical coordinate point data associated with the data change within the map-related database 103 is associated with or is within the geographical area data identified by the stored alert. The block 615 may use any desired methods to determine whether the retrieved geographical coordinate point data of the change falls within the geographical area data of the stored alert. Generally speaking, the retrieved geographical coordinate point data associated with a change as received from the map-related database 103 may denote a change associated with a geographical feature located at a single point in a map or a geographical feature located at multiple points within a map (such as a line, an area or a volume). In FIG. 5, for example, an updated train schedule at a transit station 520 or an updated address for new inhabitants that moved into a residence 510, 515 are changes clearly associated with an easily identified geographical point. Because both the transit station 520 and residence 510, 515 are represented by a single geographical point or location on a map, both locations may easily be determined to fall within the user-specified geographical area 505 as the user-specified graphical area bounds the geographical points for the station 520 and the residence 510, 515.

However, features represented by more than one geographical point, such as a line segment (e.g., a road) or a two dimensional area (e.g., a park) may simultaneously fall inside and outside a specified geographical area for an alert, the determination of whether a particular feature falls within the geographical area of the alert is dependent on the method employed. For example one method may determine that, if any portion of the feature falls outside the geographical area, then the entire feature is considered as falling outside the geographical area. Conversely, another method may determine that if any portion of the feature falls within the geographical area, then the entire feature is considered as falling within the geographical area. As an example, recent construction on a segment of the road 540 of FIG. 5 may be detected as a change in the map-related database 103 by the block 605. Because the road segment 540 does not occupy a single point location, the block 615 may utilize any of different methods to determine the "location" of the road 540 when analyzing geographical alerts. One method may include the block 615 determining whether any part of the road 540 (or other feature that is changed) falls within the user-specified geographical area 505. If so, the block 615 may decide that the road segment 540 (or other feature) falls within the user-specified geographical area 505. In implementing this method, the block 615 may determine whether either of the nodes 530 or 535 falls within the user-specified geographical area 505, and if so, transfers control to the block 620 to determine whether the feature type of the change and the feature type of the stored alert are of the same type. On the other hand, if the block 615 determines that both of the nodes 530 and 535 fall outside the geographical area, the block 615 transfers control back to the block 608 to determine whether another stored alert remains in the alert database 107. Alternatively, the block 615 may mandate that all of the various segments and points associated with the road (or a feature that is changed) be bounded by the user-specified area to detect the change to the road (or other feature) as being associated with the user-specified area. In this case, both of the nodes 530 and 535 are required to fall within the user-specified geographical area 505 to send a notification to the user.

As another example method in deciding whether a road segment 540 falls within the user-specified geographical area 505, the block 615 may determine a centroid 525, or midpoint, of the road segment 540 (or other feature being considered). Here, the routine 615 determines whether the centroid 525 of the road segment 540 (or other feature) falls within the user-specified geographical area 505 regardless of the node locations 530 and 535. If the block 615 determines that the centroid 525 of the road segment 540 falls within the user-specified geographical area 505, the routine 600 proceeds in its determination of whether to send a notification to the user and transfers control to a block 620. However, if the block 615 determines that the centroid 525 falls outside the geographical area, the block 615 does not send the user a notification, but instead transfers control back to the block 608 to determine whether another stored alert remains in the alert database 107. This operation of using either a centroid method or a method encompassing each end point, vertex, or edge lines of a geographical area may be extended to two or three dimensional objects such as parks, buildings, campuses, etc.

At a block 620, the alert identification module 315 next determines whether the retrieved feature type data from the map-related database 103 is of the same type as the feature type of the stored alert from the alert database 107. By way of example, when creating an alert at the block 420, a user may specify a feature type that includes only Place Page or location information data associated with restaurants within the user specified geographical area. The restaurant feature type is stored in the alert with the geographical area data in the alert database 107. Then, when information associated with any restaurant change occurs and is propagated to the alert engine 109, at the block 620, the alert identification module 315 determines that the restaurant feature type in the stored alert is of the same type as the change. However, if the feature type of the change and the feature type of the stored alert are not of the same type, then the block 620 transfers control back to the block 608 to determine whether another stored alert remains in the alert database 107. On the other hand, if the feature type of the change is of the same type as the one or more feature types of the stored alert, the routine 600 proceeds in its determination of whether to send a notification to the user and transfers control to a block 625, which operates to send a notification to the user.

At a block 625, the notification propagation module 320 retrieves the alert notification type attributes of the stored alert from the alert database 107. Alert notification type attributes may define how the notification is to be sent, when the notification is to be sent, whom the notification is to be sent, etc. The block 625 then sends the notification to the user(s) defined by the alert notification type attributes. For example, one of the alert notification type attributes may define the method of communication for the notification such as a text, an email, a telephone call, an account notification, etc. Another alert notification type attribute may include timing properties for the notification and thus may specify, for example, an intentional delay in sending the notification, a specific time in the future to send the notification, batching multiple notifications together to send at one time, etc. In a batching mode, the system can hold all notifications until a specified time and then send all the notifications at one time. As an example, the system may hold all notifications generated for a user throughout a given week, day, hour, etc. Then, for example, every Monday morning, every hour, etc., the system may send the user all of the held notifications generated throughout the week, day, hour, etc. in one large batch or in one large notification that aggregates the information from all the notifications.

Another example of an alert notification type may include defining the recipient(s) of the notifications such as a particular user, a group of users, a subscription list of users, a user account associated with or within a map editor 120, etc. For example, the alert engine 109 may send an alert notification in the form of an account notification to a user account in the map client 115 or map editor 120. The information conveyed in a notification may include or identify the feature or feature type that changed in the user-specified geographical area or may provide other information such as a link to the map database change. For example, the notification may apprise the user that a new 3D computer model of a building has been created within the user's specified geographical area.

After the notification has been sent, the block 625 transfers control back to the block 608 that determines whether any remaining unchecked stored alerts remain in the alert database 107. Of course, the system may process the retrieved data associated with the change from the map-related database 103 in any different order or manner. For instance, the system can determine whether the feature type of the change is of the same type at the block 620 before determining whether the geographical coordinate point of the change falls within the geographical area at the block 615.

In an alternative method, the alert database 107 is a relational database and the block 615 queries the alert database 107 to determine whether the retrieved geographical coordinate point data associated with the change falls within the boundaries of a geographical area data of any stored alert. This query may be a nested query that determines whether geographical area data of any stored alert in the alert database 107 overlaps the geographical coordinate point data of the change. The query may calculate the regions of the geographical area data of each stored alert and filter stored alerts based on that calculated region and the retrieved geographical coordinate point data of the change. Depending on how features within this calculated region are characterized, the block 615 can then determine whether a geographical coordinate point data of the change falls within the geographical area data of the stored alert.

Using systems and procedures described above, a user can easily select a geographical area on a displayed digital map and automatically be sent notifications at the occurrence of change for that specified geographical area.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, may comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Still further, the figures depict preferred embodiments of an alert engine system for purposes of illustration only. One skilled in the art will readily recognize from the foregoing discussion that alternative embodiments of the structures and methods illustrated herein may be employed without departing from the principles described herein. Thus, upon reading this disclosure, those of skill in the art will appreciate still additional alternative structural and functional designs for a system and a process for creating and implementing geographical alerts through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for generating an electronic alert associated with a change of feature data in a map-related database that stores feature data associated with geographical regions, the method comprising:
   receiving alert attribute data specifying one or more alert attributes for an electronic alert, the alert attribute data including geographical region data specifying a geographical region to be associated with the electronic alert;
   using the alert attribute data to create the electronic alert and storing the electronic alert in an alert database, the stored electronic alert adapted to be used to notify a recipient of a change in feature data stored in the map-related database for the specified geographical region of the electronic alert;
   detecting a change to feature data within the map-related database;
   determining whether the feature associated with the changed feature data is associated with the specified geographical region of the stored electronic alert; and
   sending an electronic notification to the recipient if the feature associated with the changed feature data is associated with the specified geographical region of the stored electronic alert.

2. The computer-implemented method for generating an electronic alert of claim 1, wherein receiving alert attribute data includes receiving feature type data, the feature type data indicating a type of feature for the electronic alert, and wherein determining whether the feature associated with the changed feature data is associated with the specified geographical region of the stored electronic alert includes determining if the feature associated with the changed feature data is of the same feature type as specified by the feature type data of the electronic alert.

3. The computer-implemented method for generating an electronic alert of claim 2, wherein the feature type data specifies one or more of a map data entity, a business entity, a three dimensional model, a satellite image, or a photographic image.

4. The computer-implemented method for generating an electronic alert of claim 1, wherein receiving alert attribute data includes receiving alert notification type data for the electronic alert, wherein the alert notification type data indicates how to notify the recipient of the changed feature data within the map-related database, and wherein sending an electronic notification to the recipient includes sending the electronic notification to the recipient based on the alert notification type data.

5. The computer-implemented method for generating an electronic alert of claim 4, wherein the alert notification type data specifies a method of electronically sending the electronic notification.

6. The computer-implemented method for generating an electronic alert of claim 5, wherein the method of electronically sending an electronic notification includes one or more of sending the electronic notification as an email or a text message or a phone call or an account notification.

7. The computer-implemented method for generating an electronic alert of claim 4, wherein the alert notification type data specifies the recipient by one or more of a phone number or an email address or an account notification.

8. The computer-implemented method for generating an electronic alert of claim 4, wherein the alert notification type data specifies a timing to be used to send the electronic notification to the recipient.

9. The computer-implemented method for generating an electronic alert of claim 1, wherein receiving alert attribute data specifying one or more alert attributes for an electronic alert includes enabling a user to indicate the specified geographical region for the electronic alert via a user interface.

10. The computer-implemented method for generating an electronic alert of claim 9, wherein enabling a user to indicate the specified geographical region includes presenting a map of a first geographical region to the user via the user interface and enabling the user to select the specified geographical region as a portion of the first geographical region presented on the map.

11. The computer-implemented method for generating an electronic alert of claim 10, wherein enabling the user to select the specified geographical region includes enabling the user to demarcate one or more boundaries of the specified geographical region by indicating the one or more boundaries of the specified geographical region on the presented map.

12. A geographical alert system for generating an electronic alert associated with a change of feature data stored in a map-related database that stores features associated with geographical regions, the geographic alert system comprising:
    an alert generation routine stored on one or more computer memories and that executes on one or more computer processors to receive alert attribute data from one or more users specifying one or more alert attributes for an electronic alert, the alert attribute data including geographical region data specifying a geographical region to be associated with the electronic alert;
    an alert creation routine stored on one or more computer memories and that executes on one or more computer processors to create one or more electronic alerts based on the received alert attribute data and to store the one or more electronic alerts in an alert database, each stored electronic alert adapted to be used to notify a recipient of a change in feature data as stored in the map-related database for a specified geographical region associated with the electronic alert; and
    an alert detection routine stored on one or more computer memories and that executes on one or more computer processors to detect a change to feature data within the map-related database, to analyze whether the feature associated with the changed feature data is associated with the specified geographical region of one of the one or more electronic alerts stored in the alert database, and to send an electronic notification to a recipient of the one of the one or more of the stored electronic alerts if the feature associated with the changed feature data is associated with the specified geographical region of the one or more of the stored electronic alerts.

13. The geographical alert system of claim 12, wherein the alert generation routine receives alert attribute data including feature type data, the feature type data indicating a type of feature within the map-related database for an electronic alert, and wherein the alert detection routine determines whether the feature associated with the changed feature data is associated with the specified geographical region of the one of the one or more stored electronic alerts by determining if the feature associated with the changed feature data is of the same feature type as specified by the feature type data of the one of the one or more electronic alerts.

14. The geographical alert system of claim 12, wherein the alert generation routine receives alert attribute data including alert notification type data, wherein the alert notification type data indicates information regarding how to notify the recipient of the change in feature data within the map-related database, and wherein the alert detection routine sends an electronic notification to the recipient of a particular electronic alert by sending the electronic notification to the recipient based on the alert notification type data of the particular electronic alert.

15. The geographical alert system of claim 14, wherein the alert notification type data specifies a method of electronically sending the electronic notification.

16. The geographical alert system of claim 14, wherein the alert notification type data specifies one or more recipients associated with an alert.

17. The geographical alert system of claim 14, wherein the alert notification type data specifies a timing to be used to send the electronic notification.

18. The geographical alert system of claim 12, wherein the alert creation routine enables a user to indicate the specified geographical region for the electronic alert via a user interface.

19. The geographical alert system of claim 18, wherein the alert creation routine enables a user to indicate the specified geographical region by presenting a map of a first geographical region to the user via a user interface and enabling the user to select the specified geographical region as a portion of the first geographical region presented on the map.

20. A computer-implemented method for creating an electronic alert associated with changes of feature data in a map-related database that stores feature data for features associated with geographical regions, the method comprising:
    receiving alert attribute data specifying one or more alert attributes for an electronic alert, the alert attribute data including geographical region data specifying a geographical region to be associated with the electronic alert and alert notification type data indicating a manner of notifying a recipient of changed feature data within the map-related database;

using the alert attribute data to create the electronic alert; and storing the electronic alert in an alert database, the stored electronic alert adapted to be used to notify the recipient, via an electronic notification, of changed feature data as stored in the map-related database for the specified geographical region of the electronic alert according to the alert notification type data of the electronic alert.

21. The computer-implemented method for creating an electronic alert of claim 20, wherein receiving alert attribute data further includes receiving feature type data for the electronic alert, the feature type data indicating a type of feature within the map-related database for which to detect changed feature data within the map-related database.

22. The computer-implemented method for creating an electronic alert of claim 21, wherein the feature type data specifies a feature including one or more of a map data entity, information data about a business entity, a three dimensional model, a satellite image, or a photographic image.

23. The computer-implemented method for creating an electronic alert of claim 20, wherein receiving the alert notification type data includes receiving information on how to send the electronic notification electronically.

24. The computer-implemented method for creating an electronic alert of claim 23, wherein receiving information on how to send the electronic notification electronically includes receiving information specifying to send the electronic notification via an email or a text message or a phone call or an account notification.

25. The computer-implemented method for creating an electronic alert of claim 20, wherein receiving the alert notification type data includes receiving information defining a timing as to when to send the electronic notification electronically.

26. The computer-implemented method for creating an electronic alert of claim 20, wherein receiving alert attribute data specifying one or more alert attributes for an electronic alert includes enabling a user to indicate the specified geographical region for the electronic alert via a user interface.

27. The computer-implemented method for creating an electronic alert of claim 26, wherein enabling a user to indicate the specified geographical region includes presenting a map of a first geographical region to the user via the user interface and enabling the user to select the specified geographical region as a portion of the first geographical region presented on the map.

28. A computer-implemented method for executing an electronic alert in response to a change of feature data in a map-related database that stores feature data for features associated with geographical regions, the method comprising:

detecting a change to feature data within the map-related database;

retrieving one or more stored electronic alerts from an alert database storing a set of electronic alerts, each of the retrieved electronic alerts including alert attribute data including a geographical region associated with the electronic alert and a recipient;

determining whether a feature associated with the changed feature data is located within a geographical region specified by one of the retrieved electronic alerts; and sending an electronic notification to a recipient of the one of the retrieved electronic alerts if the feature associated with the changed feature data is associated with the specified geographical region of the one of the retrieved electronic alerts.

29. The computer-implemented method for executing an electronic alert of claim 28, wherein detecting a change to feature data within the map-related database includes detecting a modification to or a deletion to or an addition to feature data in the map-related database.

30. The computer-implemented method for executing an electronic alert of claim 28, wherein detecting a change to feature data within the map-related database includes detecting a modification to or a deletion to or an addition to one or more of map data, satellite image data, three dimensional model data, location information data, or application generated data.

31. The computer-implemented method for executing an electronic alert of claim 28, wherein sending an electronic notification to a recipient includes sending the electronic notification using an electronic transmission technique specified in the one of the retrieved electronic alerts.

32. The computer-implemented method for executing an electronic alert of claim 31, wherein sending an electronic notification to a recipient includes sending the electronic notification at a time specified in the one of the retrieved electronic alerts.

33. The computer-implemented method for executing an electronic alert of claim 28, wherein determining whether the feature associated with the changed feature data is located within a geographical region specified by the one of the retrieved electronic alerts includes determining whether the changed feature data is associated with the feature that matches a feature type of the one of the retrieved electronic alerts, and wherein sending an electronic notification to a recipient of the one of the retrieved electronic alerts includes sending the electronic notification only if the changed feature data matches a feature type of the one of the retrieved electronic alerts.

34. A geographical alert system for generating an electronic alert associated with a change of feature data stored in a map-related database that stores features associated with geographical regions, the geographic alert system comprising:

an alert detection routine stored in one or more computer memories and that executes on one or more computer processors to detect a change to feature data within the map-related database;

an alert retrieval routine stored in one or more computer memories and that executes on one or more computer processors to retrieve one or more electronic alerts stored in an alert database, each retrieved alert including alert attribute data including a geographical region associated with the electronic alert and a recipient;

an alert analysis routine stored in one or more computer memories and that executes on one or more computer processors to analyze whether the feature associated with the changed feature data is associated with the specified geographical region of one of the one or more stored electronic alerts; and an electronic notification routine stored in one or more computer memories and that executes on one or more computer processors to send an electronic notification to the recipient for the one of the one or more stored electronic alerts if the feature associated with the changed feature data is a feature within the specified geographical region of the one of the one or more stored electronic alerts.

35. The geographical alert system of claim 34, wherein the alert detection routine detects a change to feature data within the map-related database by detecting a modification to or a deletion to or an addition to one or more of map data, satellite image data, three dimensional model data, location information data, or application generated data.

36. The geographical alert system of claim 34, wherein the electronic notification routine sends an electronic notification to a recipient by sending the electronic notification using an electronic transmission technique specified in the one of the one or more stored electronic alerts.

37. The geographical alert system of claim 34, wherein the electronic notification routine sends an electronic notification to a recipient by sending the electronic notification at a time specified in the one of the one or more stored electronic alerts.

38. The geographical alert system of claim 34, wherein the alert analysis routine determines whether a feature associated with the changed feature data is located within a geographical region specified by the one of the one or more stored electronic alerts and further determines whether the changed feature data is for a feature that matches a feature type of the one of the one or more stored electronic alerts, and wherein sending an electronic notification to a recipient of the one of the one or more stored electronic alerts includes sending the electronic notification only if the changed feature data is for a feature that matches a feature type of the one of the one or more stored electronic alerts.

* * * * *